United States Patent [19]

Williams

[11] Patent Number: 4,560,983

[45] Date of Patent: Dec. 24, 1985

[54] DYNAMICALLY INTERACTIVE RESPONSIVE CONTROL DEVICE AND SYSTEM

[75] Inventor: Marshall Williams, Fremont, Calif.

[73] Assignee: Ampex Corporation, Redwood City, Calif.

[21] Appl. No.: 419,632

[22] Filed: Sep. 17, 1982

[51] Int. Cl.⁴ .......................... H04Q 9/00; G06F 3/02
[52] U.S. Cl. ............................ 340/825; 340/870.42; 340/407
[58] Field of Search .................. 340/825, 870.42, 407; 74/10.41, 822, 824; 73/432 R, 432 SD; 310/93; 318/623, 676

[56] References Cited

U.S. PATENT DOCUMENTS

| | | | |
|---|---|---|---|
| 3,497,668 | 2/1970 | Hirsch | 340/407 |
| 3,701,092 | 10/1972 | Hasbrook | 340/407 |
| 3,919,691 | 11/1975 | Noll | 340/407 |
| 4,011,510 | 3/1977 | Olsen | 340/870.42 |
| 4,195,802 | 4/1980 | Gilson et al. | 340/407 |
| 4,203,046 | 5/1980 | Homann et al. | 310/93 |
| 4,244,120 | 1/1981 | Harris | 340/407 |

Primary Examiner—Donald J. Yusko
Attorney, Agent, or Firm—Rodney L. Marett; Harry G. Thibault; Joel D. Talcott

[57] ABSTRACT

A general device for the input of information in a binary format through rotational motion is disclosed, having independent means for the simultaneous output of information in a form perceivable to the human tactile sense. In particular, a knob is coupled to a shaft, a tachometer and a particle brake. An associated control means receives information from the tachometer, controls the operation of the particle brake, and interfaces the corresponding operations with the apparatus which is desired to be controlled thereby.

66 Claims, 14 Drawing Figures

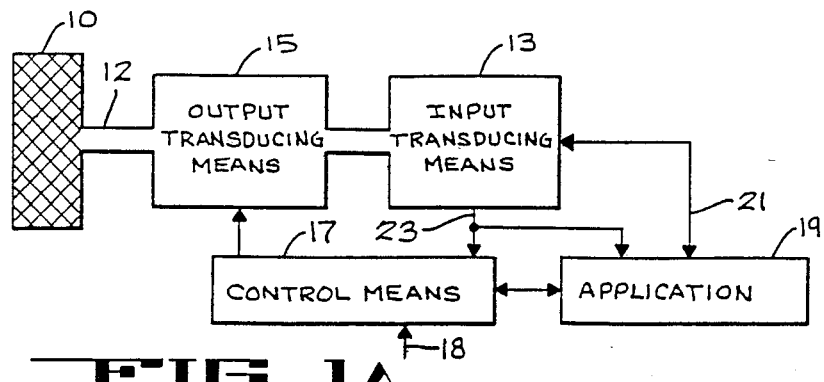
FIG_1A
FIG_1B
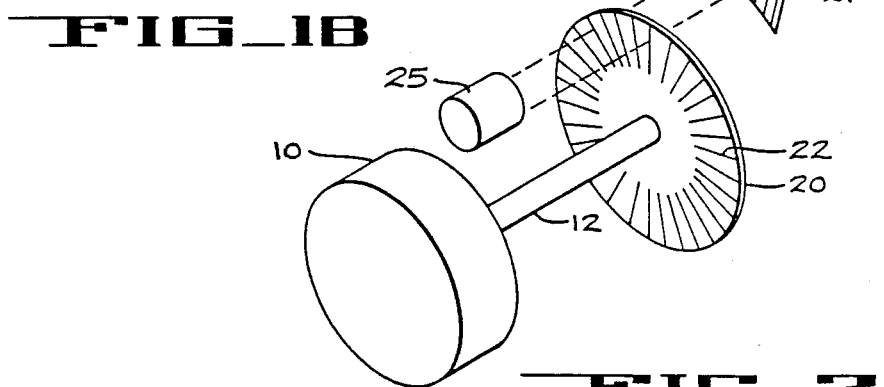
FIG_2
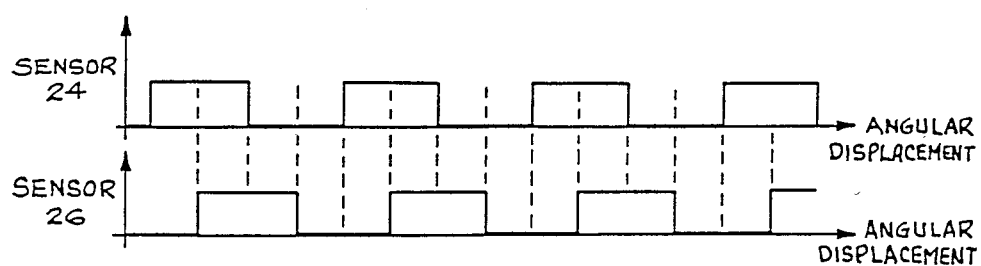
FIG_3

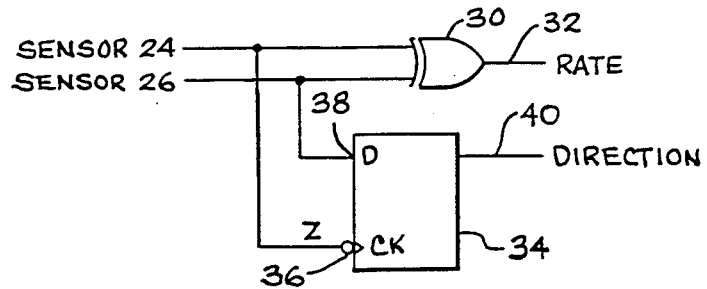
FIG_4
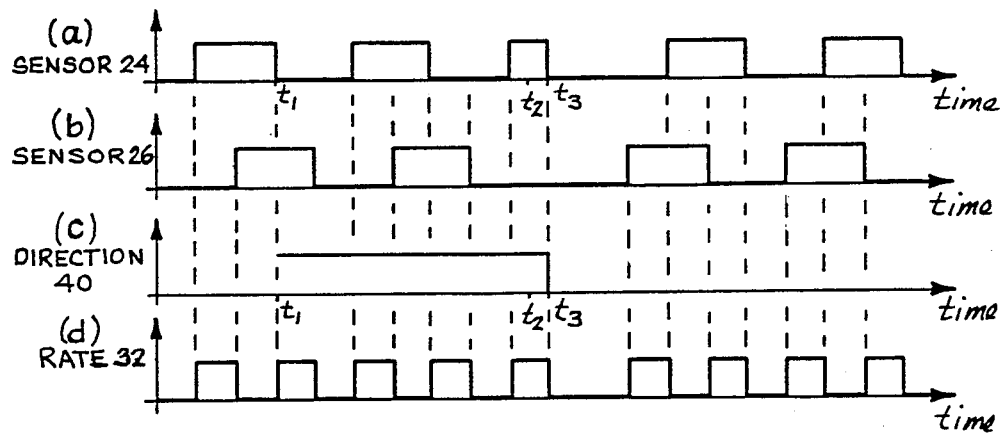
FIG_5
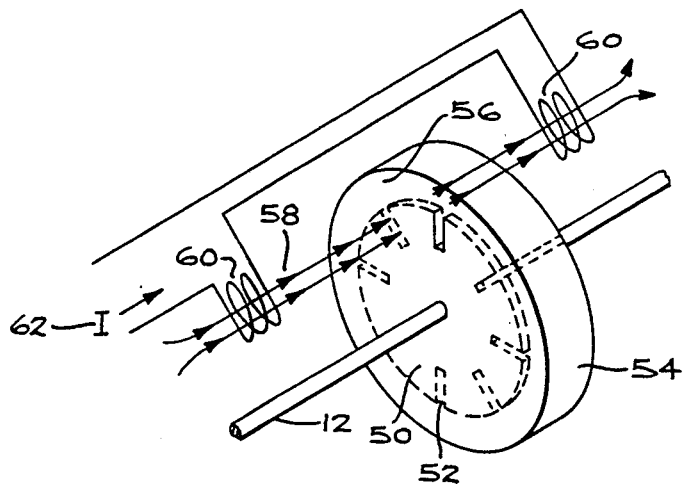
FIG_6

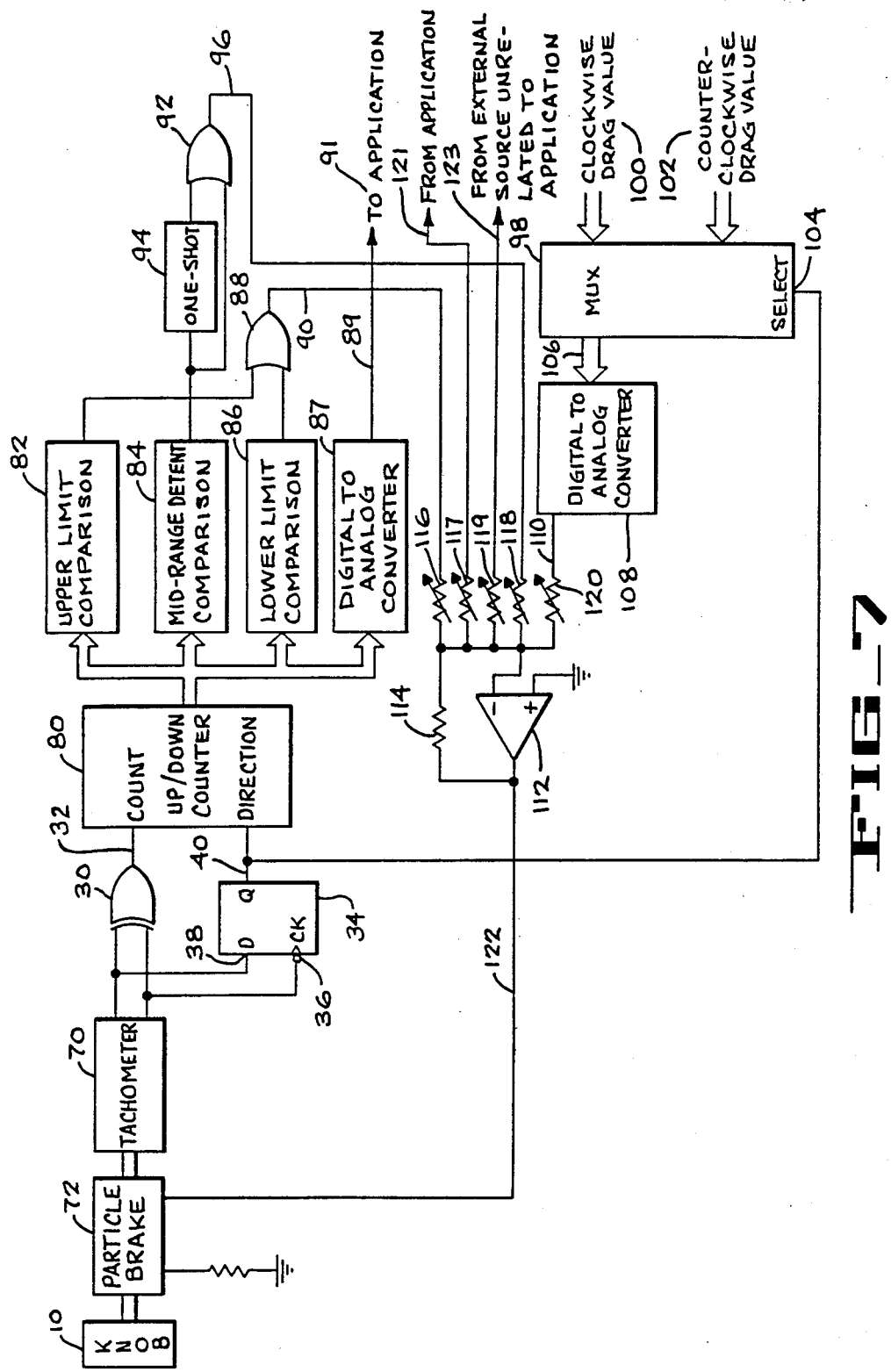
FIG_7

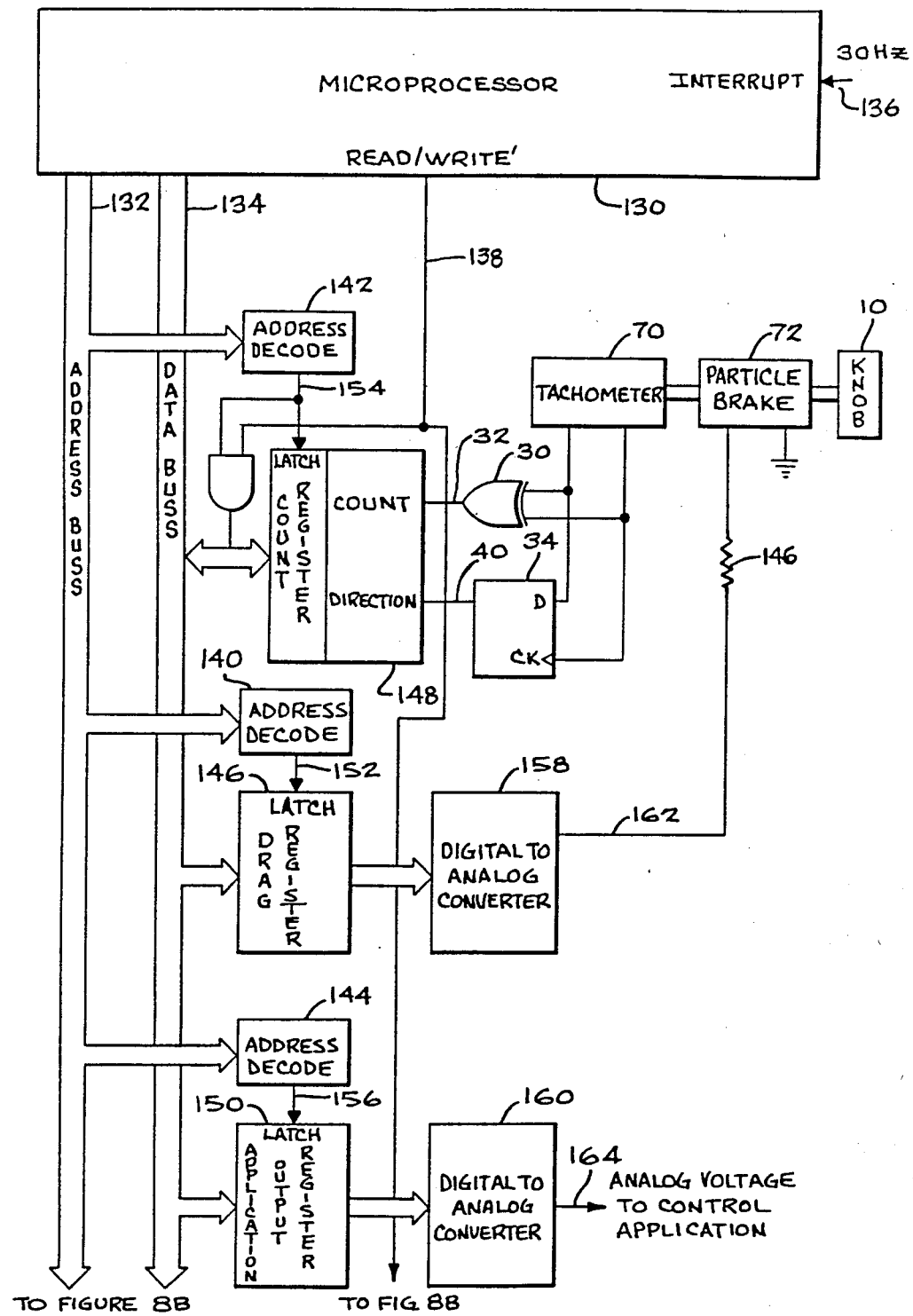
FIG_8A

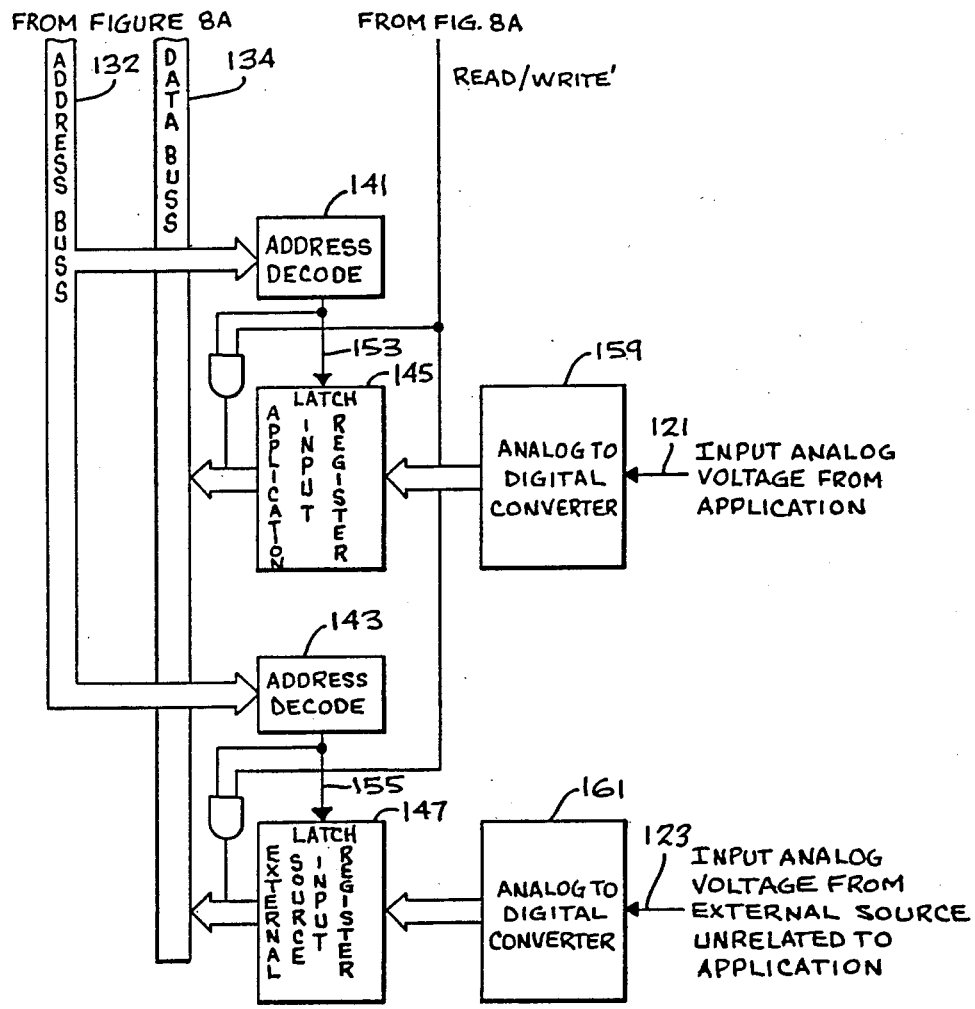
FIG_8B

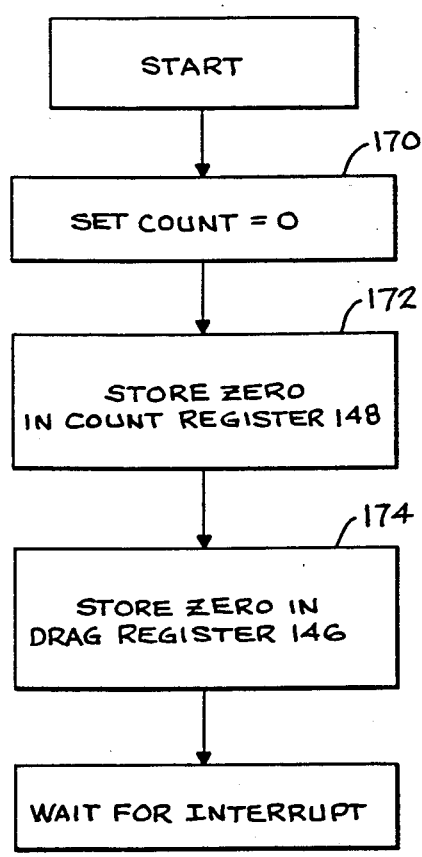
FIG_9A

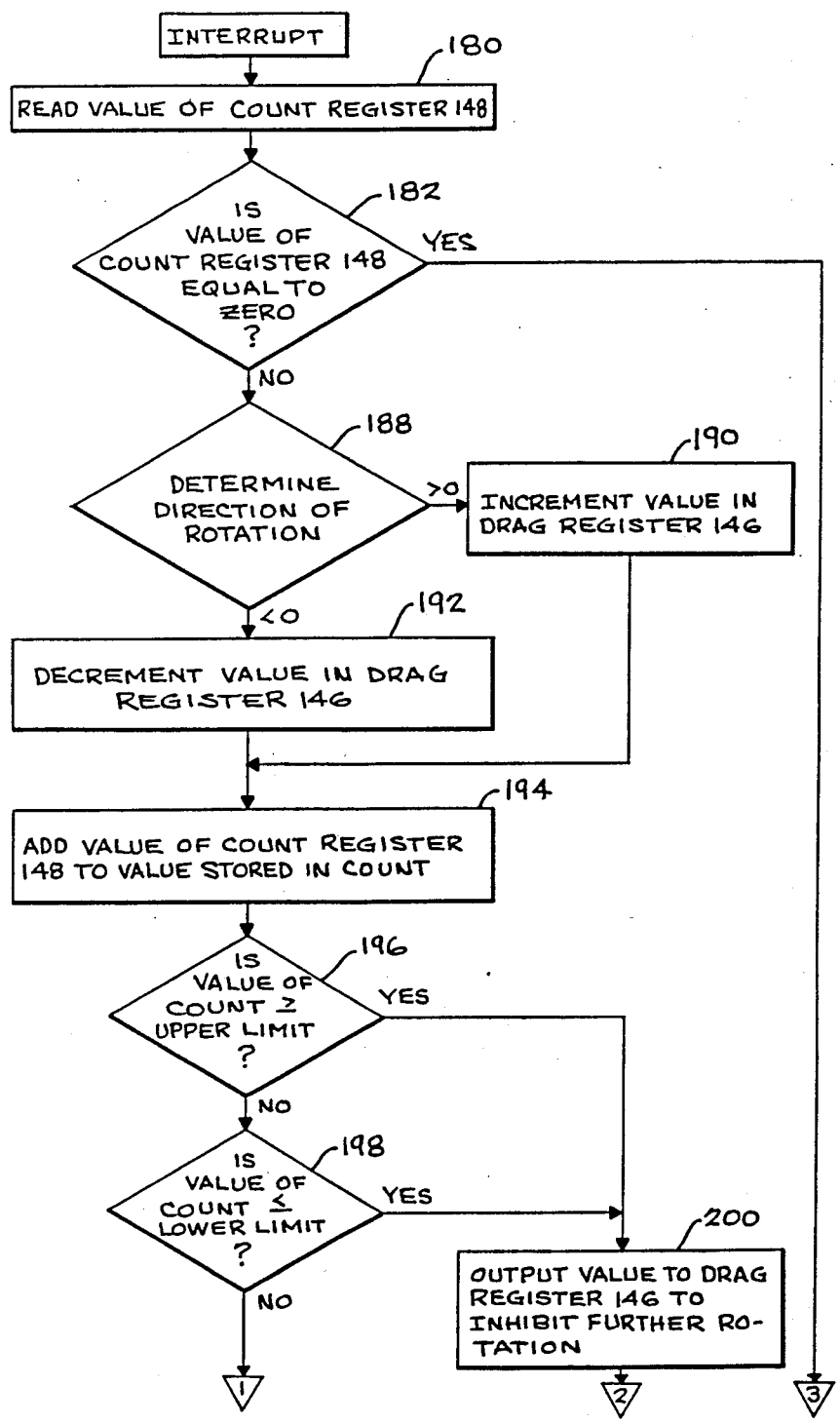
FIG_9B

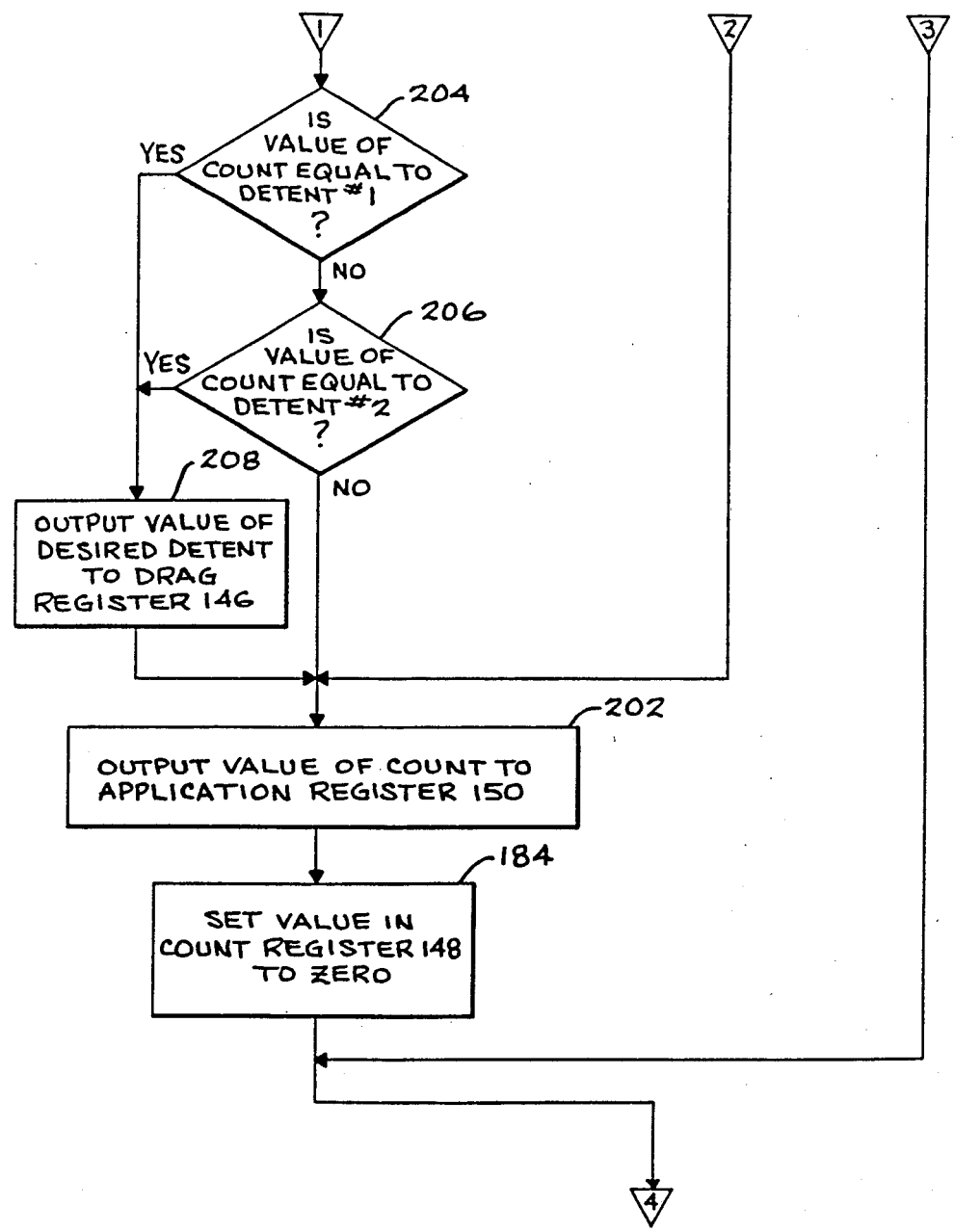
FIG_9C

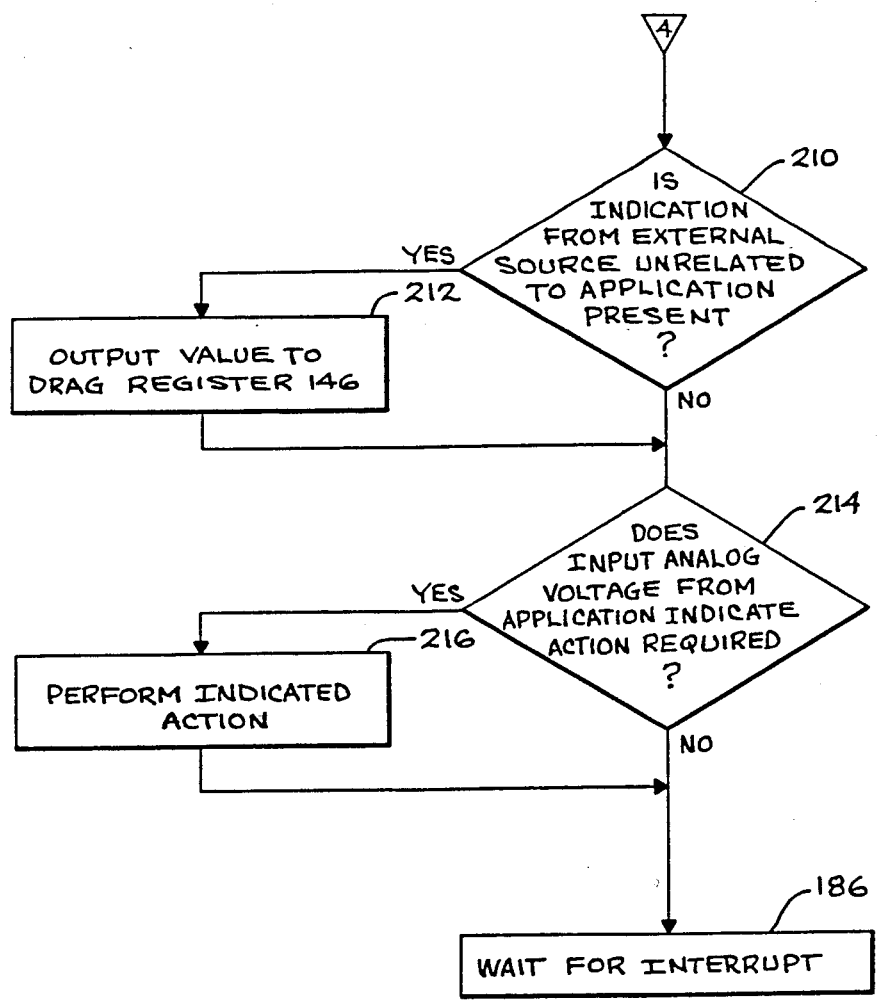
FIG_9D

DYNAMICALLY INTERACTIVE RESPONSIVE CONTROL DEVICE AND SYSTEM

BACKGROUND OF THE INVENTION

This invention relates generally to the field of controls and control systems for use with controlled systems or other utilization devices, and more particularly to such controls and control systems wherein an information signal is generated responsive to movement of a moveable element and which movement is productive of an associated interactive tactually perceivable response.

Broadly speaking, controllable apparatus or more generally utilization devices have long required the capability to interact with a managing element in connection with the operation performed by the managing element. This interfacing capability has required the flow of information in both directions: as status indications from the controllable apparatus or utilization device to the managing element, generally hereinafter referred to as an output operation; and conversely from the managing element to the controllable apparatus, generally hereinafter referred to as an input operation. In the following discussion, input and output will be with reference to the electrical system.

In dealing with controllable apparatus the managing element can take numerous forms. Frequently the managing element is a human operator who reacts accordingly to status indications from the controllable apparatus. However managing elements can assume other forms, such as automated systems including electro-mechanically controlled implements for effecting operations with respect to one or more selected parameters of movement. In this application, "operator" is used to mean any managing element, such as a human operator or electro-mechanically controlled implement or the like, that interacts with the controllable apparatus. Such systems of necessity must include an interface between the controllable apparatus and the operator which permits the efficient flow of information in both input and output operations. In the broad area of input operation, this frequently includes a displacement device having a moveable portion with a parameter of movement associated therewith. Such parameters of movement can include physical motion of either a translatory or rotational nature, e.g., the translatory or rotational movement of a single or multiple position switch, potentiometer, etc. Likewise, in the broad area of output operations, efficient flow of information requires that the information from the controllable apparatus be in a format perceivable by the operator. The formatting of such information often involves a plurality of relations involving the visual, auditory or tactile senses. Well known devices useful for the flow of output information to the visual senses are various light indicator devices including light emitting diodes and cathode ray tubes; and to the auditory senses, conventional loud speakers employing permanent magnetics and voice coils, and more recently solid state sounding devices. Tactually perceivable sensations have not been used in a dynamically interactive manner. The use of the tactile sense has been restricted to a static interaction, for example, for perception of fixed detents and/or a constant drag in devices executing translatory or rotational motion; e.g., rotational devices having a fixed drag or a fixed number of detents for indication of position.

As technology has continued to expand, controlled systems have likewise continued to expand in complexity, sophistication, and the scope of the general work or task implemented or controlled. Simultaneously with the growth in the complexity and sophistication of the controlled system has been a corresponding increase in the associated quantity of input and output information. For human operators of such systems, this has often resulted in a staggering collection of switches, knobs and indicating devices with which to deal, each frequently dedicated to control a unique parameter of the controlled system. As the basic requirement underlying all such arrays of switches, knobs and indicating devices is the bi-directional flow of information between an operator and the controlled system, a problem is often encountered. This problem relates particularly to the human limitation that only a finite amount of information can be effectively dealt with at any one time. This includes not only the basic information which may be flowing in either an input or output sense, but also the human requirement that certain physical parameters such as switch or indicator location on a panel as well as the corresponding information associated therewith must be simultaneously considered by the operator for an intelligent, desired operation to result. This requirement is particularly significant in areas where the associated desired operator response is either a rapid one or one of a creative nature.

Such requirements have frequently resulted in multifunctional inputs or output devices, such as switches or knobs whose functions can be changed in a dynamic manner in response to changing requirements, or indicating devices such as cathode ray tubes on which the display thereon can be quickly changed. In terms of the art, such devices are referred to as "soft", e.g., soft switches, to indicate that the associated functions can be changed at will.

A particular example of multifunctional use of a push button is observed with the so called "soft keys" which are frequently encountered on the typewriter type keyboard generally found with a computer terminal. The function of such keyboard keys can be generally assigned to any of a multitude of functions depending upon the particular application; such functions can thereafter be changed as easily as entering new data on the computer terminal.

While switches involving translatory motion whose functions can be changed at will are well known and widely used, input devices involving rotational motion whose function can be easily changed have not seemed to have found equal wide spread use.

With the growth of the use of microprocessors, digital processing of information is becoming increasingly widespread. Applications previously considered as distinctly analog in nature are now being processed in a digital manner, with the corresponding use of analog-to-digital converters to transform the analog information of interest to a digital format for the requisite digital processing, and the subsequent conversion of the results, in a digital format back to an analog format, for interaction with the particular environment. In such an environment where information is converted from a continuous analog nature to a discrete digital nature, it is desirable for input devices from the external world to provide information directly in a digital rather than analog format. Input devices capable of providing basic input information in a digital or binary form frequently represent translatory physical motion, such as the depressing of a switch or key. The corresponding output generally assumes one of the well known conventional forms susceptible to perception by the operator's visual or auditory sense.

In comparison with input devices involving translatory motion, there has been relatively few input devices involving rotational motion available. In the past, such devices were frequently limited to potentiometers which directly produced an output in an analog format. Consequently in using such a device for input purposes, a number of problems were present. To effectively use the output of a potentiometer which produces output in an analog format, an analog-to-digital conversion process is essential. An additional problem relates to the fact that the analog signal produced is unalterably associated with a fixed angular position; i.e., if a potentiometer were going to be used as an input device, the angular reference point, e.g., the zero reference position, always remains at the same angular position. This severely limits the usefulness of the device as an input means to a digital system.

A solution to the problem presented by the nature of the output signal produced by a potentiometer is afforded by the use of a tachometer. In particular, a slotted disc is attached to a rotatable shaft, with a light source positioned on one side of the slotted disc, and a light sensing means positioned on the opposite side of the disc, in alignment with the light source. Consequently, as the shaft is rotated, the beam of the light is interrupted by the rotating disc, thereby producing an output signal, usually of a binary nature. By appropriate decoding means, both amount of rotation as well as speed of rotation are ascertainable. It is further observed that by use of a second set of slots on the disc, distinct and separate from the first set, but displaced from the first set by an appropriate amount along with a second light sensing means and an optional second light source, information indicative of direction of rotation of the shaft is also produced.

In particular, an input device incorporating a tachometer, while being able to provide input information, still suffers from a number of short comings. In particular, such an input device, while being capable of providing information based upon rotational motion, would generally lack end stops, i.e., means to limit the extremeties of angular rotation.

Likewise, such an input device would lack detents at selected angular positions. This feature, which is commonly found on analog potentiometers is often quite useful in either presetting the input device to a known value or use as a reference point in the operation of the knob. However, by so providing fixed detents on the above described input device, a similar limitation in the flexibility results.

Furthermore, such an input device as above described incorporating a knob coupled to a tachometer by a shaft would have a fixed rotational friction or drag associated with rotation. In analog potentiometers, the amount of drag is frequently mechanically selectable, depending upon the particular device selected and the manner in which it is physically mounted. Such flexibility is clearly lacking in the above described input device. However, rotational friction or drag could be effected by mechanical adjustments on the shaft coupling the knob to the tachometer, or by other means, such would again limit the flexibility of resulting device.

SUMMARY OF THE INVENTION

In accordance with the present invention, a positionable device having a moveable portion capable of translating motion directly into an information signal, and which is capable of simultaneous response to status indications from controllable apparatus or operator providing output information to a managing element through the tactile sense, is provided. The design of such a positionable device with input/output interactive capability incorporating the present invention is extremely flexible, having the major parameters of interest associated with input and output operations being easily and dynamically changeable. The tactually perceivable sensations can be provided in functional relation or a random, arbitrary or other desired relation to movement of the moveable portion and which is changeable in response to one or more selected parameters of movement of the moveable portion. One may select among a plurality of such relations in response to any selected input, e.g., status indication. The parameters associated with input operations including direction of movement, amount of movement and rate of movement are easily defineable and changed. In particular, movement of the moveable portion could be associated with either an increase or decrease in value of one or more of the parameters, and the resulting magnitudes of parameter change associated with a given angular displacement or angular rate of rotation can likewise be easily adjusted or changed. In a like fashion, tactile parameters associated with output operation including amount of static rotational friction present, as well as the number and location of end stops and detents are easily definable and changeable. In particular, the amount of static rotational friction can vary both in response to angular position and direction of rotation. In addition, the existence and placement of end stops to limit rotation in either direction, as well as the number, placement and force required to by-pass detents is likewise easily definable and changeable.

In accordance with the present invention, a dynamically interactive responsive control device and system is produced by the combination of a rotatable shaft having a knob affixed to one end for operator interface, and communicating with a tachometer, a particle brake, and a control means.

A particle brake is a device having a rotatable shaft attached to a slotted disc which is enclosed in a chamber filled with magnetic particles, surrounded by an electrical winding through which a current can be passed. As a current is passed through the electrical winding, the magnetic particles tend to line up along the lines of force created by the magnetic field, resulting in a drag which opposes rotational motion imparted to the shaft. The amount of drag produced is directly proportional to the current applied to the electrical winding. By appropriately controlling the current through the electrical winding, a number of different and distinct tactile effects can be easily produced. In particular, by passing a continuous current through the winding, a corresponding static rotational friction effect can be achieved in amounts determined by the magnitude of the continuous current. End stops to limit rotation can be simulated by the passing of a relatively large current through the electrical winding corresponding to the particular angular position at which the placement of the individual end stops are desired. In a similar fashion, detents can be simulated by the passing of a lesser amount of current through the electrical winding corresponding to the particular angular positions at which the placement of the individual detents are desired.

The above described combination of a rotatable shaft having a knob for operator interface and communicating with a tachometer and a particle brake includes control apparatus such that rotational information derived from the tachometer is used, both in control of the particular application of interest, as well as in the generation of output information to control the particle brake in a format which is perceivable by the operators tactile sense. In particular, input information derived from the tachometer, e.g., direction of rotation, angular displacement and rate of rotation, is used both in the control of the particular application of interest and also in the generation of associated output information in a format perceivable by the operator tactile sense, including rotational drag, end stops and detents.

DESCRIPTION OF FIGURES

FIGS. 1A and B illustrates in a block diagram form the basic operation and the interactions in a soft knob with tactile feedback.

FIG. 2 illustrates an optical tachometer.

FIG. 3 illustrates the waveforms produced in the operation of the optical tachometer illustrated in FIG. 2.

FIG. 4 illustrates a circuit for the decoding of rate and direction information from the signals produced by the optical tachometer illustrated in FIG. 2.

FIG. 5 illustrates waveforms associated with the operation of the circuit illustrated in FIG. 4.

FIG. 6 illustrates a particle brake.

FIG. 7 illustrates a hardware implementation of a soft knob with tactile feedback.

FIGS. 8A and 8B together illustrate a hardware implementation of a soft knob with tactile feedback employing a microprocessor.

FIGS. 9A–9D together illustrate in a flow chart format a program which could be used in the hardware implementation illustrated in FIGS. 8A and 8B.

DETAILED DESCRIPTION

A transducer 1 in accordance with the present invention is illustrated generally in the two diagrams of FIG. 1 and is seen to be capable of uni-directional and bi-directional flows of information relative to an operator of the transducer. Moreover, as will be apparent upon consideration of the following detailed description of various preferred embodiments of the transducer 1, said flows of information are selectable. The transducer 1 of the present invention is capable of providing the bi-directional flow of information between an operator and the transducer (or of only providing information to the operator) through operator/transducer interaction means 2, the bi-directional flow of information between the transducer and the associated electrical system over a communication link 21, the uni-directional flow of information from the transducer to the electrical system over the link 21 or a separate communication link 23, and the uni-directional flow of information from an external source to the transducer over another communication link 18. A particularly salient feature of this invention is associated with the aforementioned operator/transducer interaction means 2 that is capable of providing information flow to the associated electrical system and the selectively bi-directional flow of information to the operator in a tactitely perceivable format operatively associated with the transducer. This transducer advantageously provides the ability for the operator to input information to the transducer 1 and receive outputs from the transducer 1 so that, if desired, appropriate responses can be executed. Knob 10 functions as the direct operator interface, for both the input and output of information with reference to an electrical system, generally indicated in FIG. 1 as application 19. Mounted for rotation with knob 10 on a common shaft 12 is an input transducer means 13 for the input of information to control means 17, and output transducer means 15 for the output of information from control means 17 to a operator in a format perceivable by the tactile sense. Control means 17 functions to receive input information from input transducer means 13 and to communicate such information to application 19. Control means 17 likewise functions in response to information from input transducer means 13 and application 19 to control the transmission of output information to output transducer means 15 for further transfer through shaft 12 and knob 10 to a human operator by communication through the tactile sense.

It should be understood that application 19 represents in general any electrical system with which it is desirable to interface information. It should also be clear that control means 17 could likewise receive information 18 from an external source unrelated to application 19. In a similar meanner it should be clear that input transducing means 13 could communicate directly by signal 21 to application 19, or simultaneously with control means 17 and application 19 by signal 23. Likewise control means 17 could communicate directly with application 19 independent of information received by communication link 23 from input transducing means 13.

Several features of the dynamically interactive responsive control device and system in accordance with the present invention should be clear. The movement associated with the input of information does not have a restoring force associated therewith. In particular, when motion associated with the input of information occurs, the portion of the input device remains stationary in the final position in which it is positioned. In addition, the resistance to motion can be independently controlled, and in particular does not have to be referenced to position or displacement.

In the preferred embodiment, input transducer means 13 is implemented using an optical tachometer, an embodiment of which is illustrated in FIG. 2.

Referring to FIG. 2, upon rotation of knob 10, shaft 12 will rotate. Coupled to shaft 12 is a disc 20 having optical gradations 22 which permit the passage of light from source 25 therethrough. A second set of gradations are present on plate 27. Rotation of disc 20 results in an optical interference pattern in the light responsive light energy falling on sensors 24 and 26 due to the relative motion between the gradations on disc 20 and those present on plate 27. In particular, the gradations present on plate 27 in cooperation with the gradations on disc 20 result in the production of the respective waveforms by sensors 24 and 26 having a quadrature relationship, as illustrated in FIG. 3. The manner in which the gradations are placed on plate 27 and disc 20 to result in the waveforms illustrated in FIG. 3 is well known to those skilled in the art.

A circuit for the decoding of the waveforms produced by sensor 24 and 26 in response to rotation of knob 10 is shown in FIG. 4.

Input signals from sensors 24 and 26 are supplied as inputs to EXCLUSIVE-OR gate 30 whose rate output 32 is a sequence of pulses proportional to angular displacement of shaft 12, and the rate of which is proportional to angular velocity of shaft 12. Flip-flop 34 is a D-type flip-flop. The output from sensor 24 is supplied to the clock input 36 and the output from sensor 26 is supplied to the D input 38 of flip-flop 34. Consequently upon every high-to-low transition occurring on the output signal from sensor 24, the direction output 40 of flip-flop 34 will assume the corresponding state of the output from sensor 26. The output 40 of the flip-flop 34 is indicative of the direction of rotation of the knob 10.

The operation of the circuit illustrated in FIG. 4 can be further understood by reference to the waveforms illustrated in FIG. 5. FIGS. 5(a) and 5(b) illustrate the output waveforms from sensor 24 and 26 respectively in response to rotation of disc 20 (FIG. 2). FIG. 5(c) illustrates the corresponding output 40 from flip-flop 34. FIG. 5(d) illustrates the corresponding output 32 from EXCLUSIVE-OR gate 30.

As knob 10 (FIG. 2) is rotated in a first direction, the outputs produced by sensors 24 and 26 will be as illustrated in FIGS. 5(a) and 5(b). At time $t_1$, the high-to-low transition occurring on the output of sensor 24 will result in the state of flip-flop 34 assuming the current state of the signal from sensor 26 (FIG. 5(b)). Consequently, the output 40 from flip-flop 34 will assume a high state, as illustrated in FIG. 5(c).

For the purpose of illustration, assume that a change in the direction of rotation of knob 10 occurs at time $t_2$. The change in the direction of rotation of knob 10 will be detected by the circuit of FIG. 4 at time $t_3$, when the signal from sensor 24 changes from a high to a low state. At the occurrence of the high to low transition of the output from sensor 24 at time $t_3$, flip-flop 34 will once again assume the state of the output from sensor 26. Due to the change in direction of rotation of knob 10, the corresponding state of the output from sensor 26 at time $t_3$ will be low. Consequently, the output 40 from flip-flop 34 will assume a low state. From observing FIG. 5(c), it is clear that in the simple circuit of FIG. 4, the output 40 of flip-flop 34 is indicative of the direction of rotation of knob 10. FIG. 5(d) illustrates the corresponding output 32 from EXCLUSIVE-OR gate 30.

Consequently, it is clear that by the use of a tachometer coupled to a shaft, rotational motion can directly produce information in a binary format. In particular, direction of rotation, angular displacement and angular speed are all easily obtainable.

In the preferred embodiment of the present invention, a Two Channel Incremental Optical Encoder manufactured by Hewlett Packard, series HEDS-5000 is used to implement the above described tachometer. The Hewlett Packard tachometer is more fully described in Hewlett Packard 28 mm DIAMETER TWO CHANNEL INCREMENTAL OPTICAL ENCODER KIT tentative data sheet dated January 1981, number 5953-0469 (1/81), which is incorporated by reference herein.

In the preferred embodiment, output transducer means 15 (FIG. 1) is implemented using a particle brake, best illustrated in FIG. 6. Affixed to shaft 12 is a disc 50 having a plurality of slots 52. Disc 50 is constructed of non-magnetic material, and is completely enclosed in a non-magnetic housing 54 which is filled with magnetic particles 56 in a powder form. Magnetic flux 58, produced by coil 60 in response to current I 62, follows a path normal to the surface of disc 50 and in alignment with a portion of the locus of positions occupied by slots 52. In response to application of a current I 62 to coil 60, a magnetic flux 58 is created, the amount of which being directly proportional to the amount of current I 62 applied to coil 60. In response to the magnetic flux 58, the magnetic particles 56 bind together along the lines of magnetic flux 58. The strength of the resulting link is directly proportional to the amount of the magnetic flux as determined by current I 62. Consequently, rotation of shaft 10 can be restricted by the creation of drag resulting from the application of a current I 62.

A particle brake as above described suited for use as the output transducer means 15 is commercially available from DANA INDUSTRIAL and identified by the trademark SOFSTEP. The SOFSTEP particle brake is more fully described in DANA INDUSTRIAL Simplatrol catalog S-1100 which is incorporated by reference herein.

By controlling the current to the particle brake, a number of different tactile responses can be achieved.

By passing a continuous current through coil 60, a rotational friction or drag effect can be obtained. In particular, the amount of drag produced is directly proportional to the amount of current passed through coil 62. Consequently, the amount of drag produced can be easily adjusted according to varying requirements of different applications.

While the amount of drag associated with rotational motion of potentiometers in the past is constant, a number of new and distinct programmable tactile responses are easily available in accordance with the present invention. Broadly speaking, by varying the amount of current through coil 62, the amount of drag produced can vary in any desired relation to angular position, angular velocity, direction of rotation, or any parameter or condition of interest. By way of example, in a complex process control application wherein the present invention is used to control a critical parameter, the existence of an undesirable condition resulting either from parameter adjustment (or other unrelated causes) can be easily communicated to the human operator by an increase in the amount of drag reflected as increased resistance to further movement of the knob 10 affixed to the shaft 12. For example, if the rate of increase of a parameter associated with angular position is producing undesirable results, this condition is communicated to the human operator by increasing the amount of drag in an amount appropriate to the particular conditions present.

In a similar fashion, by appropriate use of angular position information from input transducer means 13, and controlling the current through coil 62 in response thereto, limits can easily be placed on the amount of permissible angular rotation of the shaft 12, i.e., end stops could be positioned at any desired angular location relative to the rotation of the shaft.

Likewise, by appropriate adjustment of the magnitude of the current passed through coil 62 in response to angular position information from input transducer means 13, the relative angular location of points of interest can be easily communicated to the human operator, i.e., detents can be placed at any desired angular positions position relative to the rotation of the shaft 12.

Consequently, it is clear that the combination of a knob, particle brake and tachometer coupled by a common shaft, with the operation of the particle brake controlled by a control means in response to information from the tachometer, provides a soft knob with tactile feedback having extremely flexible characteristics and a broad range of applications, limited only by the sophistication of the control means.

FIG. 7 illustrates an embodiment of the control system of the present invention employing a rotatable soft knob with tactile feedback in an application providing tactually perceivable indications representative of programmable clockwise and counter clockwise end of rotation stops, programmable detents, and variations in drag associated with each direction of rotation of the rotatable knob. Moreover, the control system embodiment is constructed to provide an analog control output to control an application of interest, as well as to provide a tactile indication of information either from the application of interest or from an unrelated application.

Rate output 32 and direction output 40 are supplied to the respective count and direction inputs of up/down counter 80. In response to the output provided by flip-flop 34 on direction output line 40, up/down counter 80, in response to the output provided by the EXCLUSIVE-OR gate 30 on rate output line 32, counts in either a numerically increasing or decreasing sequence. Consequently, the numeric value of the count present in up/down counter 80 will correspond to the angular position of knob 10.

The output from up/down counter 80 is supplied to upper limit comparison means 82, mid-range detent means 84, lower limit comparison means 86 and digital to analog converter 87.

The output provided on line 89 from digital to analog converter 87 is an analog signal proportional to the angular position of knob 10, inasmuch as the counts accumulated in the up/down counter 80 is proportional to the amount and direction of angular displacement of the knob. The output provided on line 89 is used to control the particular application 91 of interest where a control voltage in an analog format may be desired. However, it is clear that a corresponding digital control signal is available directly from the output from up/-down counter 80 for applications requiring such.

Upper limit comparison means 82, mid-range detent means 84 and lower limit comparison means 86 simultaneously receive the output provided by the up/down counter 80. Each of the comparison means functions to compare the numeric value of the digital output signal from up/down counter 80 with pre-selected numeric values which can be defined depending upon the particular application and input to the comparison means, e.g., such as by thumbwheel switch settings.

The respective outputs from upper limit comparison means 82, mid-range detent means 84 and lower limit comparison means 86 become true when the count present in up/down counter 80 equals the respective numeric values pre-set in upper limit comparison means 82, mid-range detent means 84 and lower limit comparison means 86.

The outputs from upper limit comparison means 82 and lower limit comparison means 86 are both supplied as inputs to OR gate 88. Consequently, the output 90 from OR gate 88 becomes true when the value present in up/down counter 80 equals either of the respective pre-defined values in upper limit comparison means 82 or lower limit comparison means 86, i.e., when the angular postion of knob 10 corresponds to one of the pre-defined limits for angular rotation.

Due to the inductance associated with coil 60 (FIG. 6) of particle brake 72, there is associated with the production of magnetic flux 58 a time constant determined by the equivalent inductance and resistance presented by the associated electrical circuit, hereinafter referred to as the particle brake time constant. Consequently, for a perceivable tactile indication to occur in response to a current pulse applied to the coil 60 of the brake 72, the duration of the current pulse must exceed a minimum time period determined by the above discussed particle brake time constant. This is particularly significant in situations wherein the angular velocity of knob 10 is such to result in the production of a true indication from mid-range detent means 84 having a duration less than the particle brake time constant. Employing a tachometer having a large number of slots 22 (FIG. 2) and rotating the knob 10 at a large angular velocity creates such a situation.

Consequently, the output from mid-range detent means 84 is simultaneously applied as one input to OR gate 92 and as a trigger input to one shot 94. The period of the pulse produced by one shot 94 is adjusted such that it is greater than the above discussed particle brake time constant. The output from one shot 94 is applied as the second input to OR gate 92. Consequently, the output 96 from OR gate 92 is a signal having a minimum duration greater than the particle brake time constant, indicative of agreement between the angular position of knob 10 and a predefined angular position at which a detent tactile response is desired.

The numeric values 100 and 102 presented in a digital format to multiplexer 98 represent the respective desired amounts of drag to be presented to rotation of knob 10 in each direction. Multiplexer 98, in response to the binary state of the signal supplied to SELECT input 104 will supply either the clockwise drag value 100 or the counter clockwise drag value 102 as the respective output 106 from multiplexer 98. As the output provided over direction output line 40 from flip-flop 34 is supplied as the input to SELECT input 104 of multiplexer 98, the direction of rotation of knob 10 will consequently determine which of the two inputs to multiplexer 98 will be supplied as the output 106 therefrom.

The value provided over output 106 from multiplexer 98 is supplied as an input to digital to analog converter 108, which provides at its output 110 an analog signal proportional to the binary value of the digital signal supplied as an input thereto from multiplexer 98. Consequently, the resulting signal on output line 110 from digital to analog converter 108 is an analog signal representative of the amount of desired drag to be presented to rotation of knob 10.

Operational amplifier 112 and resistors 114, 116, 117, 118, 119 and 120 associated therewith form an analog voltage summing means whose output 122 is an analog voltage proportional to the algebraic sum of the respective input voltage, i.e., the voltages present at the output 90 from OR gate 88, an analog input voltage on line 121 from the application of interest, the voltage present at the output 96 from OR gate 92, an analog input voltage on line 123 from an external source unrelated to the application, and the output 110 from digital to analog converter 108. Resistors 116, 117, 118 119 and 120 are each individually adjustable as each determines the amount of amplification which will result in the analog voltage signal provided at the output 122 from operational amplifier 112 in response to the level of the associated analog voltage applied thereto. The resulting analog voltage present at output 122 is used to control the current and hence the amount of rotational friction or drag produced by particle brake 72.

As the magnitudes of each of the inputs to the analog summing circuit can be adjusted by adjusting the values of resistors 116, 117, 118, 119 and 120, the resulting amount of rotational friction produced by upper or lower comparison means 82 or 86, mid-range detent means 84, the inputs on lines 121 or 123 from either the application of interest or from the external source unrelated to the application, respectively and the directionally dependent drag represented by the output on line 110 from digital to analog converter 108 respectively, can be independently adjusted to produce the desired tactile response. In particular, as the value of resistor 116 will determine the amount of current supplied to particle brake 72 when the angular position of knob 10 equals one of the pre-defined limits of rotation, resistor 116 is adjusted to simulate the desired tactile response indicative of an end stop. Likewise the value of resistor 117 will control the amount of rotational resistance produced in response to the input received on line 121 from the application of interest. In a similar manner, the value of resistor 118 will determine the amount of rotational friction produced in response to the angular position of knob 10 equalling the predefined detent position. The value of resistor 119 will control the amount of rotational resistance produced in response to the input received on line 123 from an external source unrelated to the application of interest. Likewise the value of resistor 120 will determine the amount of continuous drag produced in response to clockwise or counter clockwise rotation as defined by clockwise drag value 100 and counter clockwise drag value 102 present at the inputs of the multiplexer 98.

Consequently, FIG. 7 illustrates one preferred embodiment of a soft knob having tactile feedback with pre-selectable end stops, detent, as well as a continuous drag effect which is dependent upon the direction of rotation, which can further produce tactile indication responsive to signals from both the application of interest as well as an external source unrelated to the application.

The flexibility of the above described soft knob with tactile response can be greatly expanded through the use of a microprocessor and associated program. FIGS. 8A and 8B illustrate one possible embodiment of such a design. FIGS. 9A–9D illustrate an example of a corresponding program in a flow diagram form which could be used in connection therewith.

For purposes of clarity of discussion, only the particular signals associated with a general microprocessor will be discussed as they relate to the particular embodiment illustrated in FIGS. 8A and 8B. It is clear that other signals not relevant to the present discussion are necessary, as are further details relating to some of the signals which are discussed. These other and further details are not necessary to the understanding of the use of a microprocessor with a soft knob having tactile feedback, and would be well known to one with ordinary skill in the art.

Referring first to FIGS. 8A and 8B, microprocessor 130 has associated therewith address buss 132, data buss 134, as well as interrupt input 136, and READ/WRITE output 138. Interrupt input 136 to microprocessor 130 serves to communicate interrupt commands that notify the microprocessor of the occurrence of external events so that appropriate actions can be taken. In the current embodiment, a 30 Hz signal is effectively supplied to interrupt input 136 to result in the regular, periodic execution by microprocessor 130 of a desired action, as more fully described hereinafter. READ/WRITE' signal placed on output line 138 serves to indicate the nature of the operation occurring with respect to data buss 134 and address buss 132, i.e., whether the current operation is the input of information to, or the output of information from microprocessor 130. Address decode 140, 141, 142, 143, and 144 each are designed to recognize a unique pre-defined address associated with drag register 146, application input register 145, counter register 148, external source input register 147 and application output register 150, respectively. In response to the presence of an address value on address buss 132 equal to the pre-defined address of drag register 146, application input register 145, counter register 148, external source input register 147 or application output register 150, the corresponding respective enable signal is produced on one of the lines 152, 153, 154, 155 or 156. An enable signal on one of the lines 152, 154 or 156 functions to effect the transfer of the current numeric value present on data buss 134 to drag register 146, counter register 148 or application register 150 respectively. In a similar fashion, in response to the presence of an address value on address bus 132 equal to the pre-defined address of counter register 148, application input register 145 or external source input register 147 the corresponding enable signals are provided over lines 154, 153 and 155. In response to the provision of the enable signal and the presence of the desired state of READ/WRITE signal on line 138, the numeric value present in count register 148, application input register 145 or external source input register 147 will be transferred to data buss 134. Digital to analog converters 158 and 160 function to convert the respective digital inputs from drag register 146 and application register 150 to corresponding analog voltages on lines 162 and 164 respectively. Analog voltage on line 162 functions to control the rotational resistance produced by particle brake 72, and analog voltage on line 164 is used in the particular application which is desired to be controlled by the rotation of knob 10. It is of course clear that a corresponding digital representation of the particular angular position of knob 10 is present in the output from application register 150, and could likewise be used in those applications requiring a control signal in a digital format. In a similar fashion, analog to digital converters 159 and 161 function to convert the input analog voltage received from application over line 121 and the input analog voltage received from external source unrelated to application over line 123 to corresponding digital values for subsequent transfer to data buss 134.

Count register 148 is a 8-bit presettable up/down counter. The direction of counting is determined by the state of direction signal 40 placed on line 40 and in response thereto, counter register 148 will either increment or decrement the current value of the count therein upon the occurrence of each rate pulse received over line 32. The value present in count register 148 can be pre-set in response to the presence of the appropriate address on address buss 132 to produce enable signal on line 154 to result in the transfer of the current value of the digital signal present on data buss 134 to count register 148. Thereafter that value will be either incremented or decremented in response to direction signal on line 40 and rate signal on line 32. In a similar fashion microprocessor 130 can read the value present in count register 148 by the specifying of the pre-defined address associated with address decode 142, which will result in the contents of counter register 148 being transferred to data buss 134.

Consequently, it is possible for microprocessor 130 to control several operations. In particular, microprocessor 130 can dynamically change the drag or rotational resistance presented to the rotation of knob 10 by controlling the current supplied to particle brake 72 through the use of drag register 146 and digital to analog converter 162 output.

In a similar fashion, microprocessor 130 can provide a control signal in a digital format from the output of application output register 150 for control of applications requiring a control signal in a digital format, or can provide a control signal in an analog format from the output of digital to analog converter 160 for control of applications requiring a control signal in an analog format.

In connection with counter register 148, a number of operations are possible. Microprocessor 130 can either store a digital value in counter register 148 or read the current value of the contents of counter register 148.

In a similar format, microprocessor 130 could receive input information from either the application of interest, or from an unrelated source, as illustrated by analog input signal lines 121 and 123. It is of course clear that while signals input over lines 121 and 123 have been shown to be in an analog format, the format of said signals could likewise be in a digital format. Input signal lines 121 and 123 enable information from either the application of interest or some other unrelated source to be made available to microprocessor 130 for appropriate response.

Using the hardware configurations illustrated in FIGS. 8A and 8B, the versatility of the soft knob with tactile feedback is greatly extended. By way of an illustrative example of the flexibility afforded by the soft knob with tactile feedback, FIGS. 9A-9D illustrate in a flow chart format a program which provides not only programmable end stops to the angular rotation of knob 10, but detents, drag on the rotation of knob 10 which is both direction and angular position dependent, and responsiveness to input information from both the application of interest and a second unrelated application.

FIG. 9A illustrates an initialization routine, and FIGS. 9B-9D the main body of the control program.

Referring first to FIG. 9A the microprocessor initially stores a zero value in a location called COUNT, indicated by step 170. Location COUNT is used for temporary storage of a value which is frequently compared with the contents of count register 148 to determine the occurrence of various events in connection with the rotation of knob 10, as will be more fully described hereinafter. Thereafter, steps 172 and 174 are executed to set the contents of count register 148 and drag register 146 to zero. Thereafter, the microprocessor executes the general control routine illustrated in FIGS. 9B-9D in response to the receipt of an interrupt, which in the preferred embodiment occurs at regular spaced intervals of time each thirtieth of a second.

Referring to FIGS. 9B-9D, in response to the receipt of an interrupt, microprocessor 130 first reads the value present in count register 148 in executing step 180, and thereafter determines if the number so read is equal to zero by executing step 182 or a positive or a negative number by executing step 188. If knob 10 has been rotated in one direction, the value in count register 148 will be a positive number. Conversely, if knob 10 has been rotated in the opposite direction, the value present in count register 148 will be a negative number. Consequently the algebraic sign of the number found in count register 148 will indicate the direction which knob 10 has been rotated.

A zero value found upon execution of count register 148 in step 182 indicates that the angular position of knob 10 has not changed since the last time it was checked by microprocessor 130, as the last task performed in executing step 184 of the general processing routine (FIG. 9A) is the setting of the value in count register 148 to zero. Consequently, if the value found in count register 148 in executing step 180 is zero, microprocessor goes to step 210 as further discussed hereinafter.

In this example, the value of drag presented to the rotation of knob 10 linearly increases with rotation in one direction, and linearly decreases with rotation in the opposite direction. Consequently, checking the direction of rotation is necessary to determine the appropriate adjustment, if any, that is to be made to the numeric value stored in drag register 146.

Execution of step 188 determines the direction which knob 10 has been rotated, from the algebraic sign of the number present in count register 148 as previously discussed. If the detected direction of rotation was, in a first direction, indicated as a value greater than zero, the value stored in drag register 146 is incremented by execution of step 190 to effect an increase in the drag presented to rotation of knob 10. If the detected direction of rotation is in the opposite direction, indicated by the presence of a value less than zero present in count register 148, the value stored in drag register 146 is decremented in step 192 to effect a decrease in the drag presented to rotation of knob 10.

After making the appropriate adjustment to the value in drag register 146 by execution of steps 190 or 192, the numeric value found in count register 148 is added to the number stored in COUNT by execution of step 194. The results of the addition is a number indicative of the angular position of knob 10.

Next, the current position of knob 10 as determined above is checked through execution of steps 196 and 198 to see if it is equal to or exceeds the maximum amount of angular rotation in either direction. This is done by comparing the value of COUNT with the corresponding numeric values associated with the desired extremes of rotations. If the condition is found to be true, a maximum torque is produced in a particle brake 72 by executing step 200 to effect the storage of the appropriate numeric value in drag register 146 and thereby inhibit further rotation of knob 10. Thereafter, microprocessor executes step 202 to output to application register 150 the current value stored in COUNT which is indicative of the angular position of knob 10. Thereafter, as knob 10 is at an extreme of permissible rotation, nothing further is to be done, and the microprocessor resets the value in count register 148 to zero by the execution of step 184 and performs the steps starting with block 210, as more fully described hereinafter.

If the value of COUNT does not equal either of the numeric values corresponding to the permissible extremes of rotation when steps 196 and 198 are executed, the microprocessor next checks the value of COUNT against the respective values which are indicative of the position of a detent by executing steps 204 and 206. If agreement is found, the microprocessor executes step 208, which outputs the appropriate numberic value to drag register 146 to effect the desired rotational resistance in particle brake 72 to indicate the desired detent. If the result of the comparison of the value of COUNT against the values associated with the location of detents when executing steps 198 and 200 does not agree, this indicates that the position of knob 10 is not currently located at an angular position which would correspond to a desired detent position.

Thereafter, as the value present in COUNT is indicative of the angular position of knob 10, this value is stored in application register 150 by execution of step 202 to produce the corresponding analog voltage 164 to control the particular application of interest.

Thereafter, as the processing of any angular change in position of knob 10 is complete at this point in the program, the value in count register 148 is set to zero by execution of step 184 so that any subsequent change in position will be detected upon execution of steps 180 and 182 when the general control routine is again executed upon receipt of an interrupt.

Thereafter, microprocessor 130 executes step 210 to check the status of the input analog voltage received over line 123 from external source unrelated to the application. This step and the associated address decode 143, external source input register 147 and analog to digital converter 161 (FIG. 8B) illustrate the example, events from unrelated applications (line 18 in FIG. 1). The appropriate action in response to an affirmative indication from execution of step 210 (FIG. 9D) results in the appropriate action, as, for example, the execution of step 212 that outputs a value to drag register 146 to effect a rotational resistance in particle brake 72 (FIG. 8A).

Thereafter, microprocessor 130 executes step 214 to check the status of the input analog voltage on line 121 from application. This step and the associated address decode 141, application input register 145 and analog to digital converter 159 (FIG. 8B) illustrate the example, events from the application. This appropriate action in response to an affirmative indication from the execution of step 214 (FIG. 9D) results in the appropriate action as, for example, execution of block 216 that outputs a value to drag register 146 to effect a rotational resistance in particle brake 72.

Upon execution of step 216, the microprocessor 130 has completed the processing of any information from knob 10, made the necessary adjustments in the rotational resistance presented by particle brake 72, made the corresponding adjustment in the analog voltage on line 164 that is controlling the particular application of interest, and checked the status of input information from both the application of interest as well as an unrelated application. Thereafter, microprocessor 130 will wait for the next regularly occurring interrupt as indicated by block 186, at which point microprocessor 130 will again execute the above described control program.

Due to the speed at which microprocessor 130 operates, a considerable amount of time will remain between the completion of the execution of the last task of the above described program and the occurrence of the next interrupt. Consequently, the microprocessor 130 could go on to process other tasks, if desired.

From the foregoing it is likewise clear that the described technique could be further expanded to allow the use of such dynamically interactive responsive control device and system to control unlimited applications, each having different and unique parameters, e.g., drag, detent, end-stops, associated with the operation thereof. Consequently many variations on the above described technique would be apparent to one with ordinary skill in the art which would fall within the spirit, scope and inventive concept of the present invention, which is to be limited only by the following claims.

What is claimed is:

1. A control for the input of information to a utilization device to control at least one parameter associated therewith, comprising:
   a member positionable over a range and moveable throughout said range for effecting an output response and providing a tactually perceivable sensation in response to movement of said member with resistance to said movement producing a tactually perceivable sensation controllable independent of its position in said range; and
   means operatively coupled to said member for generating an indication of the position of said member and direction of movement of said member.

2. A control as recited in claim 1 further comprising means operatively coupled to said member for controlling the tactually perceivable sensation provided in response to said movement of said member.

3. Apparatus for the input of information from a displacement device to a controlled system to control at least one operating parameter associated therewith, and for the production of information in a tactile format in response to an output therefrom, comprising:
   first means for translating information from the displacement device to a format for communication to the controlled system;
   control means responsive to said first means for producing a control signal to control an operating parameter associated with the controlled system and for producing an output signal;
   second means responsive to the output signal for restricting the maximum angular displacement of the rotation device between a pre-defined first and second limit; and
   third means responsive to the output signal for producing resistance to the rotation of the rotation device.

4. Apparatus for the input of information from a rotational motion device to a controlled system to control at least one operating parameter associated therewith, and for the production of information in a tactile format in response to an output therefrom, comprising:
   first means for translating information from the rotational motion device to a format for communication to the controlled system;
   control means responsive to said first means for producing a control signal to control a parameter associated with the controlled system and for producing an output signal;
   second means responsive to the output signal for restricting the maximum angular displacement of the rotation device between a pre-defined first and second limit; and
   third means responsive to the output signal for producing resistance to the rotation of the rotation device.

5. Apparatus for the input of information from a translatory motion device to a controlled system to control at least one operating parameter associated therewith, and for the production of information in a tactile format in response to an output therefrom, comprising:

first means for translating information from the translatory motion device to a format for communication to the controlled system;

control means responsive to said first means for producing a control signal to control a parameter associated with the controlled system and for producing an output signal;

second means responsive to the output signal for restricting the maximum angular displacement of the rotation device between a pre-defined first and second limit; and third means responsive to the output signal for producing resistance to the rotation of the rotation device.

6. Apparatus as recited in claim 3, 4 or 5, further comprising:

fourth means responsive to the output signal for providing tactile indication of a plurality of angular positions.

7. Apparatus as recited in claim 6, further comprises:

fifth means for producing a first signal representative of amount of displacement of the motion device and a second signal representative of direction of displacement of the motion device.

8. Apparatus as recited in claim 6, further comprising:

sixth means responsive to the controlled system for producing a tactile indication.

9. Apparatus as recited in claim 8, wherein said sixth means further comprises:

seventh means responsive to the controlled system for producing resistance to the motion of the motion device.

10. Apparatus as recited in claim 9, wherein said seventh means further comprises:

eighth means responsive to the controlled system for inhibiting the motion of the motion device in one direction.

11. Apparatus as recited in claim 9, wherein said seventh means further comprises:

ninth means responsive to the controlled system for inhibiting motion of the motion device in both directions.

12. Apparatus as recited in claim 9 wherein said seventh means further comprises:

tenth means responsive to the controlled system for reducing resistance to the motion of the motion device.

13. Apparatus as recited in claim 7, wherein said control means comprises:

counter means responsive to the first and second signal for counting in a sequence determined by the second signal, the number of occurrences of the first signal, and producing an output corresponding to the numeric count;

comparison means responsive to the numeric count of said counter means for comparing the numeric count with a plurality of pre-defined numeric values, and producing an output signal when the numeric count of said counter means equals one of said pre-defined numeric values; and conversion means, responsive to the numeric count of said counter means for producing the control signal.

14. Apparatus for the input of information from a motion device to a controlled system to control at least one operating parameter associated therewith, and for the production of information in a tactile format in response to an output therefrom, comprising:

first means for translating information from the motion device to a format for communication to the controlled system;

control means responsive to said first means for producing a control signal to control and operating parameter associated with the controlled system and for producing an output signal;

second means responsive to the output signal for restricting the maximum angular displacement of the rotational device between a pre-defined first and second limit; and fourth means responsive to the output signal for providing tactile indication of a plurality of angular positions.

15. Apparatus as recited in claim 14, further comprising:

third means responsive to the output signal for producing resistance to the motion of the motion device.

16. Apparatus for the input of information from a rotational motion device to a controlled system to control a single or plurality of parameters associated therewith, and for the production of information in a tactile format in response to an output therefrom, comprising:

first means for translating information from the rotational motion device to a format for communication to the controlled system;

control means responsive to said first means for producing a control signal to control an operating parameter associated with the controlled system and for producing an output signal;

second means responsive to the output signal for restricting the maximum angular displacement of the rotational device between a pre-defined first and second limit; and fourth means responsive to the output signal for providing tactile indication of a plurality of angular positions.

17. Apparatus as recited in claim 16, further comprising:

third means responsive to the output signal for producing resistance to the rotational motion of the rotational motion device.

18. Apparatus for the input of information from a translatory motion device to a controlled system to control a single or plurality of parameters associated therewith, and for the production of information in a tactile format in response to an output therefrom, comprising:

first means for translating information from the translatory motion device to a format for communication to the controlled system;

control means responsive to said first means for producing a control signal to control an operating parameter associated with the controlled system and for producing an output signal;

second means responsive to the output signal for restricting the maximum angular displacement of the rotational device between a pre-defined first and second limit; and fourth means responsive to the output signal for providing tactile indication of a plurality of angular positions.

19. Apparatus as recited in claim 17, further comprising:

third means responsive to the output signal for producing resistance to the translatory motion of the translatory motion device.

20. Apparatus as recited in claims 3, 4, 5, 14, 15, 16, 17, or 18, further comprises:
fifth means for producing a first signal representative of amount of displacement of the motion device and a second signal respresentative of direction of displacement of the motion device.

21. Apparatus as recited in claims 3, 4, 5, 14, 15, 16, or 17, further comprising:
sixth means responsive to the controlled system for producing a tactile indication.

22. Apparatus as recited in claim 21, wherein said sixth means further comprises:
seventh means responsive to the controlled system for producing resistance to the motion of the motion device.

23. Apparatus as recited in claim 22, wherein said seventh means further comprises:
eighth means responsive to the controlled system for inhibiting the motion of the motion device in one direction.

24. Apparatus as recited in claim 22, wherein said seventh means further comprises:
ninth means responsive to the controlled system for inhibiting motion of the motion device in both directions.

25. Apparatus as recited in claim 22, wherein said seventh means further comprises:
tenth means reponsive to the controlled system for reducing resistance to the motion of the motion device.

26. Apparatus as recited in claim 19 further comprises:
fifth means for producing a first signal representative of amount of displacement of the motion device and a second signal representative of direction of displacement of the motion device.

27. Apparatus as recited in claim 26, wherein said control means comprises:
counter means responsive to the first and second signal for counting in a sequence determined by the second signal, the number of occurrences of the first signal, and producing an output corresponding to the numeric count;
comparison means responsive to the numeric count of said counter means for comparing the numeric count with a plurality of pre-defined numeric values, and producing an output signal when the numeric counter of said countermeans equals one of said pre-defined numeric values; and
conversion means, responsive to the numeric count of said counter means for producing the control signal.

28. Apparatus as recited in claim 19 further comprising:
sixth means responsive to the controlled system for producing a tactile indication.

29. Apparatus as recited in claim 28, wherein said sixth means further comprises:
seventh means responsive to the controlled system for producing resistance to the motion of the motion device.

30. Apparatus as recited in claim 29, wherein said seventh means further comprises:
eighth means responsive to the controlled system for inhibiting motion of the motion device in both directions.

31. Apparatus as recited in claim 29, wherein said seventh means further comprises:
ninth means responsive to the controlled system for inhibiting motion of the motion device in both directions.

32. Apparatus as recited in claim 29, wherein said seventh means further comprises:
tenth means responsive to the controlled system for reducing resistance to the motion of the motion device.

33. Apparatus for the input of information in a rotational format to a controlled system to control a at least one operating parameter associated therewith, and for the production of information in a tactile format in response to output therefrom, comprising:
shaft means;
a tachometer coupled to the shaft means which produces a first signal in response to angular displacement of said shaft means, and a second signal in response to direction of rotation of said shaft means;
control means responsive to the first and second signals of the tachometer for producing a control signal to control the parameter associated with the electrical system and for producing an output signal; and
a particle brake coupled to the shaft means responsive to the output signal.

34. Apparatus as recited in claim 20, wherein said control means comprises:
counter means responsive to the first and second signal for counting in a sequence determined by the second signal, the number of occurrences of the first signal, and producing an output corresponding to the numeric count;
comparison means responsive to the numeric count of said counter means for comparing the numeric count with a plurality of pre-defined numeric values, and producing an output signal when the numeric count of said counter means equals one of said pre-defined numeric values; and
conversion means, responsive to the numeric count of said counter means for producing the control signal.

35. Apparatus as recited in claim 34, wherein said conversion means further comprises:
analog conversion means, responsive to the numeric count, for producing the control signal in an analog format responsive to the numeric value of said count.

36. Apparatus as recited in claim 33, wherein said control means comprises:
counter means responsive to the first and second signal for counting in a sequence determined by the second signal, the number of occurrences of the first signal, and producing an output corresponding to the numeric count;
comparison means responsive to the numeric count of said counter means for comparing the numeric count with a plurality of pre-defined numeric values, and producing an output signal when the numeric count of said counter means equals one of said pre-defined numeric values; and
conversion means, responsive to the numeric count of said counter means for producing the control signal.

37. A method for the input of information from a displacement device to a controlled system to control at least one operating parameter associated therewith, and for the production of information in a tactile format in response to an output therefrom, comprising the steps of:
- translating information from the displacement device to a controlled format for communication to the controlled system;
- producing a control signal responsive to the translated information from the displacement device to control a parameter associated with the controlled system and producing an output signal;
- restricting the maximum angular displacement of the displacement device responsive to the output signal between a pre-defined first and second limit; and
- producing resistance to the displacement of the displacement device responsive to the output signal.

38. A method for the input of information from a rotational motion device to a controlled system to control at least one operating parameter associated therewith, and for the production of information in a tactile format in response to an output therefrom, comprising the steps of:
- translating information from the rotation motion device to a format for communication to the controlled system;
- producing a control signal responsive to the translated information from the motion device to control an operating parameter associated with the controlled system and producing an output signal;
- restricting the maximum angular displacement of the rotation device between a pre-defined first and second limit responsive to the output signal; and
- producing resistance to the rotation of the rotation device responsive to the output signal.

39. A method for the input of information from a translatory motion device to a controlled system to control at least one operating parameter associated therewith, and for the production of information in a tactile format in response to an output therefrom, comprising the steps of:
- translating information from the translatory motion device to a controlled format for communication to the controlled system;
- producing a control signal responsive to the translated information from the translatory motion device to control an operating parameter associated with the controlled system and producing an output signal;
- restricting the maximum angular displacement of the rotation device responsive to the output signal between a pre-defined first and second limit responsive to the output signal; and
- producing resistance to the rotation of the rotation device responsive to the output signal.

40. A method as recited in claim 37, 38 or 39, further comprising the steps of:
- providing tactile indications of a plurality of angular positions responsive to the output signal.

41. A method as recited in claim 40, wherein said translatory step further comprises:
- producing a first signal representative of amount of displacement of the motion device and a second signal representative of direction of displacement of the motion device.

42. A method as recited in claim 40, further comprising:
- producing a tactile indication responsive to the electrical system.

43. A method as recited in claim 42, wherein said producing tactile indication step further comprises:
- producing resistance to the motion of the motion device responsive to the electrical system.

44. A method as recited in claim 43, wherein said producing resistance step further comprises the step of:
- inhibiting the motion of the motion device in one direction responsive to the electrical system.

45. A method as recited in claim 43, wherein said producing resistance step further comprises:
- inhibiting motion of the motion device in both direction responsive to the electrical system.

46. A method as recited in claim 43, wherein said producing resistance step further comprises the step of:
- reducing resistance to the motion of the motion device responsive to the electrical system.

47. A method as recited in claim 41, wherein said translating step further comprises:
- counting in a sequence determined by the second signal, the number occurrences of the first signal, and producing an output corresponding to the numeric count;
- comparing the numeric count with a plurality of predefined numeric values, and producing an output signal when the numeric count of said counter means equals on of said predefined numeric values;
- producing the control signal responsive to the numeric count.

48. A method for the input of information from a motion device to a controlled system to control at least one operating parameter associated therewith, and for the production of information in a tactile format in response to an output therefrom, comprising the steps of:
- translating information from the motion device to a format for communication to the controlled system;
- producing a control signal responsive to the translated information from the motion device to control an operating parameter associated with the controlled system and for producing an output signal;
- restricting the maximum angular displacement of the rotational device between a predefined first and second limit in response to the output signal; and
- providing tactile indication of a plurality of angular positions responsive to the output signal.

49. A method as recited in claim 48, further comprising the steps of:
- producing resistance to the motion of the motion device responsive to the output signal.

50. A method for the input of information from a rotational motion device to a controlled system to control at least one operating parameter associated therewith, and for the production of information in a tactile format in response to an output therefrom, comprising the steps of:
- translating information from the rotational motion device to a format for communicating the controlled system;
- producing a control signal responsive to the translated information from the rotational motion device to control the parameter associated with the controlled system and for producing an output signal;
- restricting the maximum angular displacement of the rotational device between a predefined first and second limit responsive to the output signal; and
- providing tactile information of a plurality of angular positions responsive to the output signal.

51. A method as recited in claim 50, further comprising the steps of:
   producing resistance to the rotational motion of the motion device responsive to the output signal.

52. A method for the input of information from a translatory motion device to a controlled system to control at least one operating parameter associated therewith, and for the production of information in a tactile format in response to an output therefrom, comprising the steps of:
   translating information from the translatory motion device to a format for communication of the controlled system;
   producing a control signal responsive to the translated information from the translatory motion device to control an operating parameter associated with the controlled system and for producing an output signal;
   restricting the maximum angular displacement of the rotational device between a predefined first and second limit in response to the output signal; and
   providing tactile indication of a plurality of angular positions responsive to the output signal.

53. A method as recited in claim 52, further comprising the steps of:
   producing resistance to the translatory motion of the translatory motion device responsive to the output signal.

54. A method as recited in claim 37, 38, 39, 47, 48, 50, 51, or 52, wherein said translatory step further comprises:
   producing a first signal representative of amount of displacement of the motion device and a second signal representative of direction of displacement of the motion device.

55. A method as recited in claims 37, 38, 39, 47, 48, 50, 51, or 52, further comprising:
   producing a tactile indication responsive to the electrical system.

56. A method as recited in claim 55, wherein said producing tactile indication step further comprises:
   producing resistance to the motion of the motion device responsive to the electrical system.

57. A method as recited in claim 56, wherein said producing resistance step further comprises the step of:
   inhibiting the motion of the motion device in one direction responsive to the electrical system.

58. A method as recited in claim 56, wherein said producing resistance step further comprises:
   inhibiting motion of the motion device in both direction responsive to the electrical system.

59. A method as recited in claim 56, wherein said producing resistance step further comprises the step of:
   reducing resistance to the motion of the motion device responsive to the electrical system.

60. A method as recited in claim 53, wherein said translatory step further comprises:
   producing a first signal representative of amount of displacement of the motion device and a second signal representative of direction of displacement of the motion device.

61. A method as recited in claims 53 further comprising:
   producing a tactile indication responsive to the electrical system.

62. A method as recited in claim 61, wherein said producing tactile indication step further comprises:
   producing resistance to the motion of the motion device responsive to the electrical system.

63. A method as recited in claim 62, wherein said producing resistance step further comprises the step of:
   inhibiting the motion of the motion device in one direction responsive to the electrical system.

64. A method as recited in claim 62, wherein said producing resistance step further comprises:
   inhibiting motion of the motion device in both direction responsive to the electrical system.

65. A method as recited in claim 62, wherein said producing resistance step further comprises the step of:
   reducing resistance to the motion of the motion device responsive to the electrical system.

66. A method as recited in claims 60, wherein said translating step further comprises:
   counting in a sequence determined by the second signal, the number of occurrences of the first signal, and producing an output corresponding to the numeric count;
   comparing the numeric count with a plurality of pre-defined numeric values, and producing an output signal when the numeric count of said counter means equals one of said pre-defined numeric values;
   producing the control signal responsive to the numeric counter.

* * * * *

UNITED STATES PATENT AND TRADEMARK OFFICE
CERTIFICATE OF CORRECTION

PATENT NO : 4,560,983
DATED : December 24, 1985
INVENTOR(S): Marshall Williams

It is certified that error appears in the above-identified patent and that said Letters Patent is hereby corrected as shown below:

Column 18, Line 64, change "17" to --18--.

Column 23, Line 30, delete "47"; and after "48," insert --49,--.

Column 23, Line 37, delete "47"; and after "48," insert --49,--.

Signed and Sealed this

Twelfth Day of October, 1999

Attest:

Q. TODD DICKINSON

*Attesting Officer*  *Acting Commissioner of Patents and Trademarks*